(12) United States Patent
Wu et al.

(10) Patent No.: US 10,163,144 B1
(45) Date of Patent: Dec. 25, 2018

(54) EXTRACTING DATA FROM A CATALOG

(71) Applicant: Amazon Technologies, Inc., Reno, NV (US)

(72) Inventors: Jianhui Wu, Bellevue, WA (US); Krishnamurthy Koduvayur Viswanathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 665 days.

(21) Appl. No.: 14/479,026

(22) Filed: Sep. 5, 2014

(51) Int. Cl.
G06Q 30/00 (2012.01)
G06Q 30/06 (2012.01)
G06F 17/30 (2006.01)

(52) U.S. Cl.
CPC ......... *G06Q 30/0627* (2013.01); *G06F 17/30* (2013.01); *G06F 17/3071* (2013.01); *G06F 17/30705* (2013.01); *G06F 17/30713* (2013.01); *G06Q 30/06* (2013.01); *G06Q 30/0601* (2013.01); *G06Q 30/0603* (2013.01); *G06Q 30/0623* (2013.01)

(58) Field of Classification Search
CPC .......... G06Q 30/0601–30/0645; G06Q 30/06; G06Q 30/0627; G06Q 30/0623; G06Q 30/0603; G06Q 17/30; G06Q 17/30705; G06Q 17/3071; G06Q 17/30713
USPC ......... 705/26.1–27.2, 26.61, 26.63; 707/736, 707/737, 740, 738
See application file for complete search history.

(56) References Cited

U.S. PATENT DOCUMENTS

| 7,197,479 B1* | 3/2007 | Franciscus de Heer ..................... G06F 17/30867 705/26.62 |
| 2010/0312726 A1* | 12/2010 | Thompson ........... G06K 9/6254 706/12 |
| 2011/0264598 A1* | 10/2011 | Fuxman ............. G06O 30/0281 705/343 |
| 2011/0307356 A1* | 12/2011 | Wiesinger .............. G06Q 30/06 705/27.1 |
| 2012/0101918 A1* | 4/2012 | Battle .................... G06Q 30/00 705/26.63 |
| 2014/0006407 A1* | 1/2014 | Rabii ................ G06F 17/30867 707/738 |

(Continued)

OTHER PUBLICATIONS

Gargi, Ullas; Tretter, Daniel R. Organizing a Collection of Objects; accessed via ProQuest. (Year: 2010).*

(Continued)

*Primary Examiner* — Michael Misiaszek
*Assistant Examiner* — Allison G Wood
(74) *Attorney, Agent, or Firm* — Kilpatrick Townsend & Stockton LLP

(57) ABSTRACT

Techniques for extracting unstructured quantitative data may be provided. For example, a process may attempt to extract unstructured quantitative data to form structured data. This quantitative data may be used for searchable ordering of items in an electronic marketplace. For example, a process may attempt to find common attributes amongst several item descriptions. The common attributes may be recognized in the unstructured data, stored as structured data, and incorporated with a network page to allow the user to search for a particular item with a particular attribute. The desired attribute can help narrow a set of results from a search query.

20 Claims, 7 Drawing Sheets

(56) References Cited

U.S. PATENT DOCUMENTS

2014/0229307 A1* 8/2014 Kallumadi ......... G06Q 30/0601
                                                    705/26.1

OTHER PUBLICATIONS

Chan, Fong; Parker, Harry J; Dial, Jack G; Lam, Chow S; Chan, Louis Yau-Kwong. Implementing a Computerized Job-Matching Program with a Hierarchical Occupational Structure. The Journal of Rehabilitation 55.n2: p38(6). National Rehabilitation Association . (Apr. 1989 -Jun. 1989). (Year: 1989).*

* cited by examiner

EXTRACTING DATA FROM A CATALOG

BACKGROUND

When a merchant wants to sell an item online, the merchant customarily provides a description or a picture to help describe the item for potential buyers. The merchant may use various descriptions, like "Acme Co. Model M camera" or "BUY NOW!!!!! Last day to purchase this AMAZING CAMERA!!!!" to describe the same item. In the aggregate, these descriptions are difficult to analyze and/or sort, especially when a buyer wants to search for a particular item from a combined merchant sales web page that fails to limit item descriptions to a particular naming convention.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for extracting unstructured quantitative data (e.g., textual descriptions, sentences stored outside of a database, an email or application programming interface (API) that accepts item information outside of a form or template, human language, etc.) to form structured data (e.g., data corresponding with fixed fields and/or records, data stored in a relational database or spreadsheet containing an attribute name and attribute value, etc.). This quantitative data may be used for searchable ordering of items in an electronic marketplace. For example, a process may attempt to find common attributes amongst several item descriptions (e.g., thousands, millions, etc.). The common attributes may be recognized in the unstructured data, stored as structured data, and incorporated with a network page to allow the user to search for a particular item with a particular attribute. The desired attribute can help narrow a set of results from a search query.

In an illustrative example, a thousand merchants provide item information for items that the merchants would like to offer for sale through an electronic marketplace. The item information includes descriptions like "Acme A100 16 MP 5× Optical Zoom 2.7-inch LCD," "A100 20 MP 3.0-inch Optical Screen," and "Acme A100 Camera with 3× Optical Zoom, Red." Portions of the descriptions are recognized to identify that the three descriptions are associated with similar items (e.g., cameras) and also identify one or more important attributes associated with these items (e.g., "16 MP" and "20 MP" occur 67% of the time, so the attribute associated with "MP" is probably important to merchants when they advertise their items). A group or cluster of items can be determined or formed (e.g., a "16 MP camera" group or a "20 MP camera" group). A user may be provided with a search tool to find one or more of these groups or clusters as well (e.g., through a network page or other user interface). The user's interactions with the clusters, order history, and other data can help adjust the clusters for later adjustments of the user interfaces (e.g., more or fewer clusters).

Figure 1:
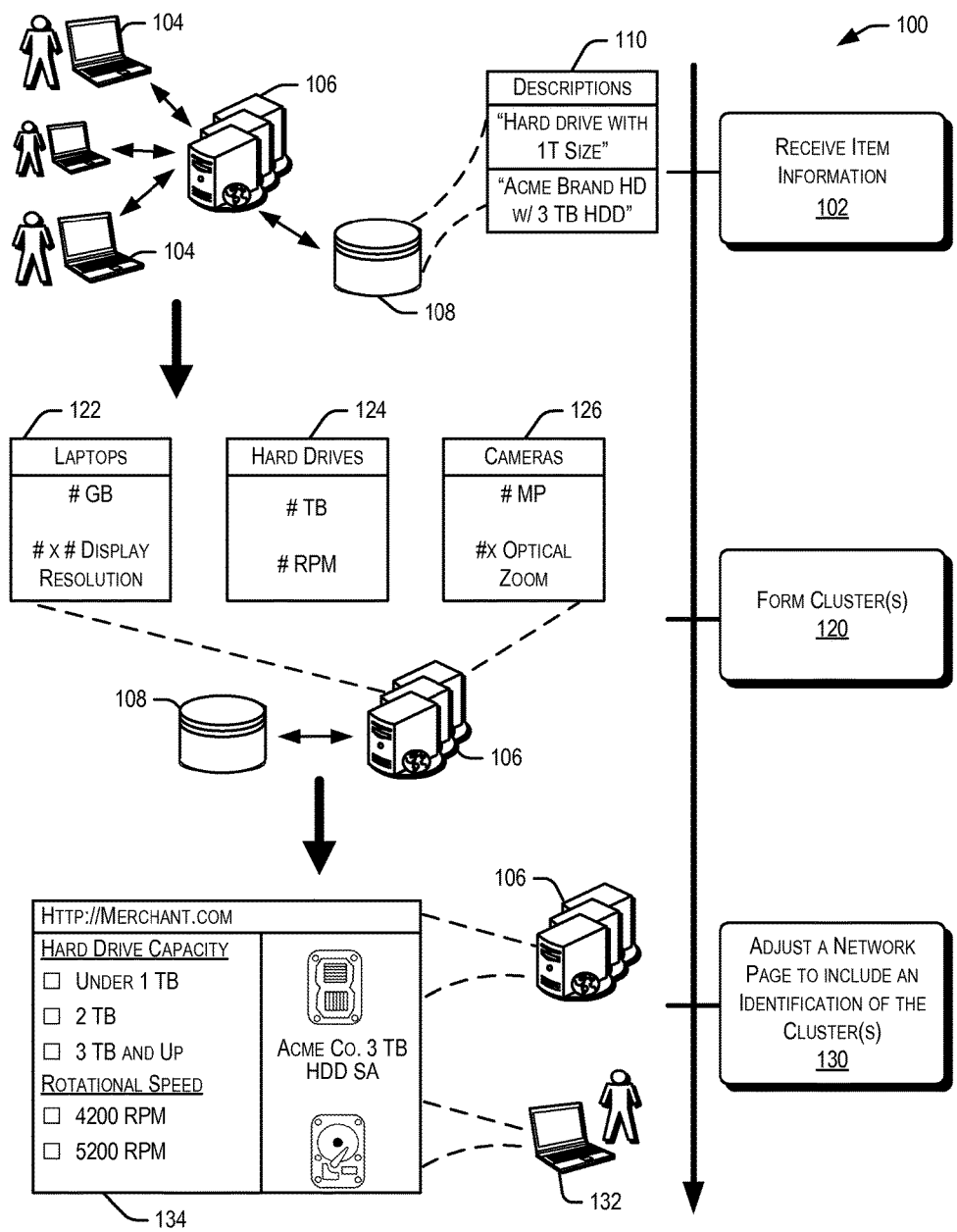
FIG. 1 illustrates an illustrative flow for extracting quantitative data for searchable ordering described herein, according to at least one example.

FIG. 1 illustrates an illustrative flow for extracting quantitative and/or qualitative data for searchable ordering described herein, according to at least one example. The process 100 can begin with receiving item information 102. For example, one or more computing devices 104 (e.g., operated by one or more merchants) can provide item information to a computing device 106 (e.g., an electronic marketplace computing device, a merchant computing device, a computing device that hosts network pages, etc.). The item information can be associated with a plurality of items that the merchants would like to offer to users. The merchants operating one or more computing devices 104 can upload, type, or otherwise transmit the item data to the computing device 106.

The computing device 106 can interact with a data store 108 to process and/or store the item information. For example, the item information 110 can include one or more textual descriptions, images, or other information about an item as unstructured data. As illustrated, the item information 110 can include "hard drive with IT size" or "Acme Brand HD w/3 TB HDD." In some examples, item information 110 can be received from the merchants, which may be stored in a data store as unstructured data. In some examples, one or more portions of the data may also be stored in the data store 108 as unstructured data. It should be appreciated that any form of data can be stored in data store 108 without diverting from the scope of the disclosure.

One or more attributes associated with the item information may be identified. For example, the item may be apparel, sporting goods, books, various types of media (e.g., DVDs, MP3s, etc.), electronics, or other classifications of items. An attribute of apparel may be size, gender, or specific types of apparel (e.g., shirts, pants, etc.). An attribute for electronics (e.g., a camera) may be memory capacity, weight, screen size, mega pixels, resolution, or any other values or types (e.g., quantitative values as well as qualitative values and/or types). Another example of an electronics item (e.g., hard drive) can include other attributes, including hard drive rotational speed, capacity, physical volume, weight, any cable interfaces, price, and the like.

In some examples, a measurement value and/or unit of measurement may be identified in the item information. An algorithm or process can identify families of quantities for attributes as units of measurement. For example, gigabytes (or GB), terabytes, megabytes, etc. may refer to memory capacity, while kilograms (or KG), grams, ounces, pounds, etc. may refer to weight. In some examples, a process can identify an attribute as a number followed by letters or symbols in the item information and determine that the portion of the item information is a measurement value associated with a unit of measurement (e.g., $5.00, 1 TB, 6-inch, etc.).

In some examples, the unit of measurement may be compared with a unit dictionary. For example, MP may be related to megapixels and/or cameras in the unit dictionary. In another example, TB and GB may be related and/or translated to terabytes and gigabytes in the unit dictionary, respectively. When a portion of the item information is compared with the unit dictionary (e.g., "15 MP" is compared with "MP" for cameras), the measurement value and/or unit of measurement can be associated with the particular type of item, attribute for an item, and the like. In some examples, the correlation between the attribute from the unstructured data and the unit dictionary may help further distinguish, sort, group, etc. the plurality of items.

The unit dictionary may be updated. For example, gigabytes (or GB), terabytes, megabytes, etc. may refer to memory capacity of a hard drive. As the capacity of hard drives increases, including up to a petabyte, an exabyte, etc., the unit dictionary may be updated to identify these values in the item information and to associate these values with the capacity of a hard drive.

Multiple units of measurement and/or attribute may be identified in the item information. For example, the item information may include "500 GB hard drive red color, also available in 1 TB and 2 TB." The algorithm may recognize the attributes "500 GB," "1 TB," and "2 TB." When comparing these attributes with the unit dictionary, each attribute may be recognized and/or stored in the data store 108 as the capacity of the item (e.g., a hard drive). In some embodiments, the item may be associated with one or more capacities listed in the item information. Additionally, in some examples, equivalent values that are recognized using different units (e.g., 1000 GB and 1 TB) may be stored as the recognized units, respectively, or may be converted into a common or standard unit (e.g., 1000 GB may be converted to 1 TB or vice versa). In some examples, the conversion may be made based at least in part on a preferred or primary unit of measurement. In some examples, the conversion may be done prior to providing the data to the user such that it is not confusing the user. However, the converted units may not always be stored in the converted form. In this way, a conversion may be made dynamically just prior to presentation on the user interface.

In some aspects, clusters may be merged. For example, when one or more clusters are identified as corresponding to a similar or same type (e.g., GB storage for card readers and TB storage for card readers), the similar clusters may be merged. In another example, a first cluster may include only GB values and a second cluster may include only TB values. As such, if it is determined that the values of the two clusters are for a particular measurement (e.g., hard drive sizes), the first and second clusters may be merged. Once merged, one or more tests may be performed on the merged cluster. For example, after merging, if the exclusion rate is below a threshold, then the first and second clusters should not have been merged. Alternatively, if the exclusion rate is still good after merging the two clusters, then those clusters should actually be merged, which improves the coverage of the clusters. In some cases, the unit dictionary may provide the information that identifies the two or more clusters may be good candidates for merging. Again, once merged, the exclusion rate of the merged cluster (which may be a merge of more than two clusters) may be checked.

Only relevant and/or important units of measurement and measurement values may be identified in the item information. For example, a unit of measurement may be identified in 60% of the textual description received. If 50% is a threshold to relevance (e.g., identified by a learning algorithm, computing device, etc.), the particular unit of measurement that appears in 50% of the item information from merchants may be important for merchants to identify in the items they offer to potential buyers. If another unit of measurement is only identified in 20% (e.g., "dpi" or dots per inch, etc.), the unit of measurement may not be as relevant in association with an attribute of an item.

The process 100 may also determine or form cluster(s) or groups 120. For example, the computing device 106 can form the clusters or groups. Items may be associated with several clusters or groups. For example, items may include laptops, hard drives, cameras, or any of the items mentioned herein. The clusters or groups associated with the laptop items may be hard drive size, display, size, weight, etc. The clusters or groups associated with the hard drives items may be hard drive size, interface, brand, capacity, etc. The clusters or groups associated with the cameras items may be brand, digital camera megapixels, optical zoom, screen size, etc.

The clusters or groups may be determined or formed by analyzing the item information for a plurality of items. For example, thousands of entries include the term "camera" as part of the unstructured data (e.g., "Buy this camera for only $100," "Acme Co. Model A camera 15 MP," "10 MP 4× optical zoom camera with free SSD card," etc.). A cluster or group may be formed to include the term "camera." Later in the process, items may be associated and/or assigned to that cluster or group, after the cluster or group has been formed.

The clusters or groups can be further sorted to include a common attribute, unit of measurement, and/or measurement value, which may help further organize and sort the items that are associated with the group. As illustrated in cluster 122, which includes laptops, the items associated with this group can be further sorted by the amount of memory the laptop includes (e.g., gigabytes or GB, "8 GB," etc.), a screen resolution (e.g., 720p or 1280×720 resolution), or other information associated with attributes of the laptop (e.g., operating system, processor, graphics, hard drive, etc.). As illustrated in cluster 124, which includes hard drives, the items associated with this group can be further sorted by capacity (e.g., terabytes or TB, "2 TB," etc.), spindle speed (e.g., rotations per minute or RPM, "7200 rpm," etc.), or other attributes (e.g., interface, buffer size, dimensions, weight, data transfer rate, latency, seek time, etc.). As illustrated in cluster 126, which includes cameras, the items associated with this group can be further sorted by resolution or pixels (e.g., megapixels or MP, "16 MP," etc.), zoom (e.g., 5.0× optical zoom, 4.0× digital zoom, etc.), or other attributes (e.g., image sensor, file format, aperture, image stabilization, shutter speed, exposure modes, etc.).

The clusters or groups can be further sorted to include a particular measurement value and/or range of measurement values. For example, one cluster can include "500 GB," another cluster can include "1 TB," and another cluster can include "2 TB." In another example, one cluster can include "Under 50 GB," another cluster can include "500 to 999 GB," and another cluster can include "1 TB and above."

A clustering algorithm may be implemented. For example, the algorithm may group 500 GB (gigabyte), 1 TB (terabyte), 2 TB, and other capacity values to distribute these values for a single attribute. The clustering algorithm may also separately group together 1 GB, 2 GB, and other values that are associated with a different attribute (e.g., RAM) and/or 1 TB, 2 TB, or 3 TB that are associated with yet another attribute (e.g., hard drive sizes).

In some examples, kernel distances may be computed to help identify clusters or groups as well. For example, an unsupervised learning algorithm can compute kernel distances between the clusters and group the clusters together. The kernel distance algorithm may consider similar units of measurement and/or attributes when computing and grouping the clusters. In some examples, various mathematical computations known in the art may be used to compute the kernel distances and/or form the clusters.

The clusters may be filtered as well. For example, one or more attributes may be pre-defined and include various units of measurement. The pre-defined values may be stored in a unit dictionary and include several units of measurement (e.g., some that refer to RAM and others refer to image quality, etc.). The percentage of items offered by merchants may be determined as well (e.g., ordered through a network page, offered through an electronic marketplace with thousands of merchants, etc.). When the percentage of items offered by merchants is above a threshold (e.g., 70%), then the attribute may be considered important and/or relevant (e.g., item coverage). Clusters or groups that are not relevant may be removed (e.g., filtered).

The filter may be based in part on past attributes. For example, when a first set of item information is received, relevant attributes may be recognized and stored in data store 108. When a subsequent set of item information is received, the relevant attributes may be recognized and stored as well (e.g., identifying a unit of measurement or other attribute that appears in 70% of the textual descriptions, etc.). In some examples, the attributes from the subsequent set of item information may be compared with attributes from the first set of item information (or any other item information received before the subsequent item information). When the attributes appeared in the first set of item information (e.g., above a certain threshold, more than 50% of the textual descriptions received from merchants, etc.), these attributes may be relevant in the current set of item information and/or used to form the clusters.

Filtering may also incorporate an exclusion rate (e.g., phrase group exclusion rate). An exclusion rate may be associated with the concept of excluding clusters or groups for an item (e.g., that are associated with an attribute or unit of measurement, etc.). For example, a radio electronic device may include several attributes, including cable length and signal strength. The cable length attribute can include clusters including 5-feet, 10-feet, 20-feet, and 30-feet, while the signal strength cluster can include 2,000-feet and 3,000-feet. A plurality of radios may be associated with these clusters, but a single radio in the plurality of radios may only be associated with one cluster of each attribute at a time. For example, radio A may be associated with 10-feet of cable length and 2,000-feet of signal strength and radio B may be associated with 20-feet of cable length and 1,000-feet of signal strength. Radio A may not be associated with two clusters for cable length (e.g., 10-feet and 30-feet), but can be associated with two attributes (e.g., cable length and signal strength).

Filtering may also remove noise and/or outliers in the data. Noise may refer to data that hinders the identification of attributes and/or clusters. For example, item information may include "I'm selling a package of 3 hard drives, including 500 GB, 1 TB, and 2 TB. BUY NOW!" The item information may refer several item identifiers. In some examples, the item information from this particular merchant may be removed (e.g., considered "noise" in the data), and the clustering/grouping may proceed with the other plurality of textual descriptions (e.g., hundreds, thousands, millions, etc.).

Items may be assigned to the clusters or groups. For example, an item identifier may be "1000001" and refer to a particular item (e.g., hard drive) sold by a particular merchant. This item may be assigned to a first cluster identifying the hard drive capacity associated with this item identifier, assigned to a second cluster identifying the rotational speed associated with this item identifier, and the like. A plurality of items may be assigned (e.g., mapped, associated, correlated, etc.) with one or more clusters or groups, so that when a particular cluster is activated, the items assigned to that cluster are provided.

Once the clusters or groups have been identified, filtered, curated, or otherwise generated, the process 100 may also adjust a network page and/or user interface to include an identification of the cluster(s) or groups 130. For example, the computing device 106 (e.g., an electronic marketplace computing device, a computing device that hosts network pages, etc.) can provide a network page for a user's computing device 132. The network page 134 can be displayed by the user's computing device 132.

The network page 134 can include one or more identifications of the clusters. As illustrated, the "hard drive" cluster includes a "hard drive capacity" attribute with clusters of items associated with "under 1 TB," another cluster of items associated with "2 TB," and another cluster of items associated with "3 TB and up." The "hard drive" cluster may also include a "rotational speed" attribute, including "4200 RPM" and "5200 RPM." In some examples, when the user activates one of these clusters (e.g., "3 TB and up"), the items associated with the cluster can be displayed on the network page 134. In some examples, these clusters may be provided after filtering, comparing with one or more thresholds, and/or after other exclusionary and/or grouping algorithms are performed.

In some examples, behavioral metrics may affect the network page 134, based in part on how users use these indications of clusters on the network page (e.g., in the aggregate). For example, users may activate a particular indication of a cluster, 50-times per day, and a different indication of a cluster, 10-times per day. The more active indication of a cluster may be used as information for the algorithm to form clusters in future iterations of the algorithm. In another example, users may activate an indication of a cluster, and add an item to an electronic shopping cart 50% of the time (e.g., which is above a threshold of 10%, which is more frequent than other indications of clusters, etc.). In some examples, user behavior may also be analyzed in terms of purchasing an item, accessing a detailed information network page about the item, or other metrics that can quantitatively measure a user's interest in items associated with the clusters and/or attributes.

In some examples, the behavioral metrics may be used to form the groups or clusters. For example, the network page 134 may display a first cluster (e.g., "1 TB to 2.9 TB") and second cluster (e.g., "3 TB to 4.9 TB"). The users may activate the second cluster 50% more often than the first cluster. When the network page is provided to subsequent users, the network page (e.g., by the computing device 106)

may display multiple groups associated with the second cluster (e.g., "3 TB to 3.9 TB" and "4 TB to 4.9 TB"), remove or combine the first cluster with other clusters (e.g., "Under 3 TB"), or other adjustments. In other examples, the behavioral metrics may be associated with a click rate (e.g., activating a cluster or other indication or link), hit rate (e.g., viewing an item detail network page), order or purchase rate, item availability, or other behavioral metrics (e.g., to help manage a display on a user interface).

When a cluster or group is activated, a plurality of items associated with the cluster or group can be displayed on the network page 134. As illustrated, the network page 134 includes images and textual descriptions of hard drives on the right-hand side, with the clusters or groups on the left-hand side. The clusters or groups may be displayed adjacent to or overlapping the items. While the clusters or groups are shown on the left-hand side, such information may be provided on any portion of the user interface such as, but not limited to, on the top, on the bottom, as a pop-up, or the like. In some examples, the user may select an item on the right-hand side of the network page 134 to be directed to a detailed information page, order page, or other network page that provides additional information or features for the item.

In some examples, the network page 134 may track a user's interaction with the clusters or groups. For example, if users regularly select a particular cluster, the system may identify that the regularly selected cluster is a valuable cluster for this product type and may continue to provide such information on the network page 134 for that product type. Alternatively, if users rarely ever select a particular cluster, the system may identify that this cluster is not a valuable cluster for that product type. As such, the particular cluster that is not regularly selected may be removed from the network page 134 or not included on the network page for future presentations of that product type or item. In some examples, metrics are collected regarding whether users are selecting the refinements or refinement values that are presented on the network page 134. The metrics may be compared against a post-launch threshold as feedback to the system regarding the value of the refinements and/or clusters being provided. For example, if a megapixels cluster for point-and-shoot cameras has a low click-through rate (the rate with which the clusters are selected for that category), the system may remove that cluster from the point-and-shoot camera category. However, the cluster may have a higher click-through rate for a different type of camera and, as such, the megapixel cluster may continue to be provided as a refinement option for those other camera types. The click-through rates may be calculated for each cluster per browse node (or category type).

Figure 2:
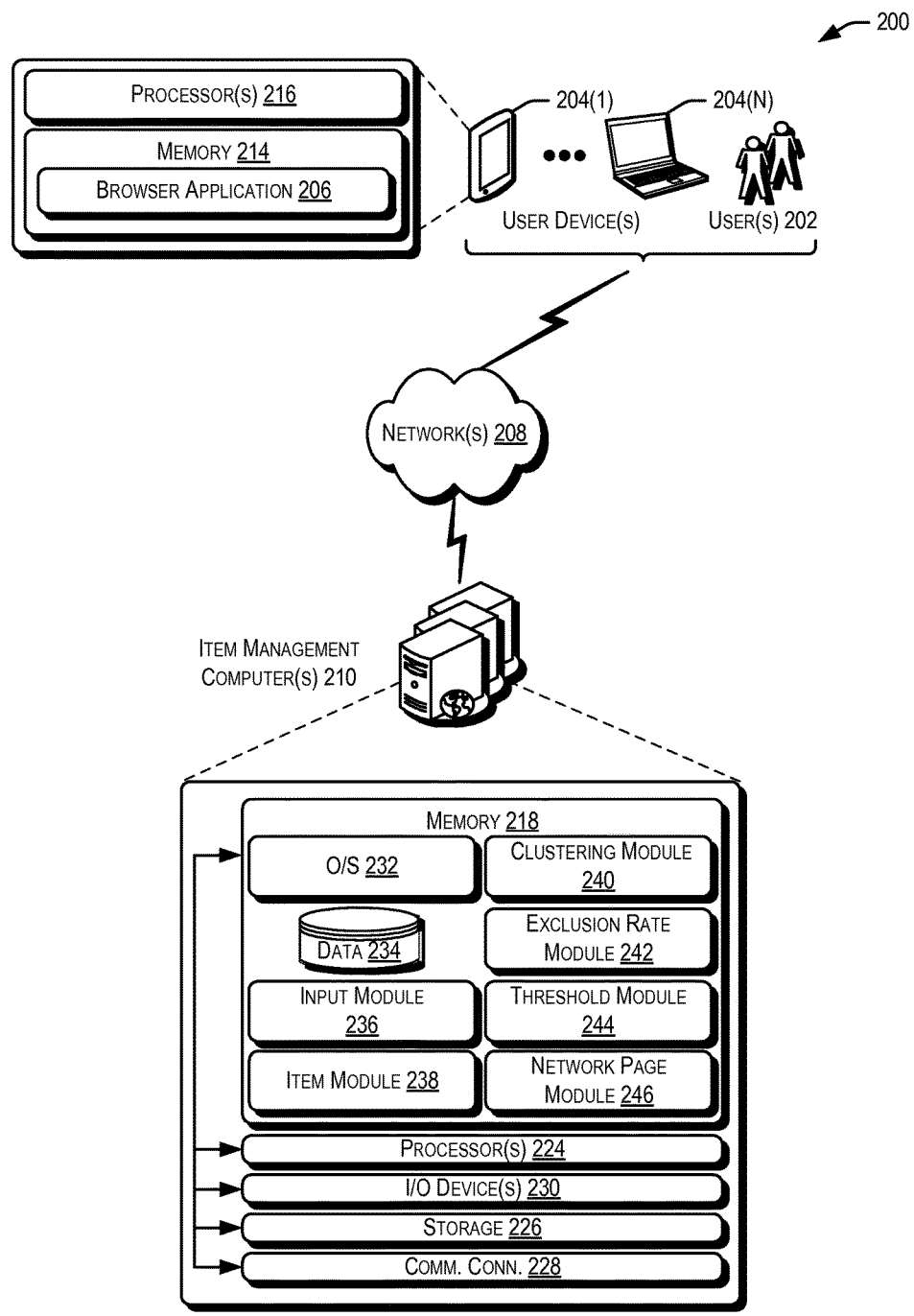
FIG. 2 illustrates an example architecture for extracting quantitative data for searchable ordering described herein that includes an item management computer and/or a user device connected via one or more networks, according to at least one example.

FIG. 2 illustrates an example architecture for extracting quantitative data for searchable ordering described herein that includes an item management computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more item management computers 210. The one or more item management computers 210 may, in some examples, provide computing resources such as, but not limited to, client entities, low latency data storage, durable data storage, data access, management, virtualization, cloud-based software solutions, electronic content performance management, etc. The one or more item management computers 210 may also be operable to provide web hosting, computer application development, and/or implementation platforms, combinations of the foregoing, or the like to the one or more users 202. The one or more item management computers 210, in some examples, may extract quantitative data, including relevant item attributes from unstructured data.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the item management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more item management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the item management computers 210 via the networks 208, or via other network connections. Additionally, the user devices 204 may be part of the distributed system managed by, controlled by, or otherwise part of the item management computers 210 (e.g., a console device integrated with the item management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the item management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the item management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the item management computers 210 may be in communication with the user devices 204 and/or other service providers via the networks 208, or via other network connections. The item management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the item management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of item management computers 210, the memory 218 may be volatile (such as RAM) and/or non-volatile (such as ROM, flash memory, etc.). The item management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the item management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the item management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The item management computers 210 may also contain communications connection(s) 228 that allow the item management computers 210 to communicate with a stored database, another computing device or server, user terminals and/or other devices on the networks 208. The item management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an input module 236, an item module 238, a clustering module 240, an exclusion rate module 242, a threshold module 244, and/or a network page module 246. In some examples, the input module 236 may be configured to receive item information associated with a plurality of items. In some examples, the item information (e.g., associated with the plurality of items) may be unstructured and/or include one or more textual descriptions of the plurality of items.

The input module 236 may also be configured to receive the item information through a user interface, application programming interface (API), or other means of providing information. For example, a plurality of merchants may access a network page (e.g., provide login credentials, open and search for a network page, etc.). The network page may be associated with a restricted merchant network page. The merchant may type or upload the textual descriptions, images, or other information of items that the merchant would like to offer through the merchant network page.

The memory 218 may also include an item module 238. The item module 238 may be configured to identify an attribute in a plurality of items from item information. In some examples, the attribute is a quantitative attribute that describes a portion of the plurality of items. For example, the plurality of items may include clothing, electronics, and physical media. The attribute "size=large" may only be associated with a portion of the plurality of items (e.g., the clothing, or some of the items in clothing, etc.).

The item module 238 may also be configured to identify a measurement value and a unit of measurement in the item information (e.g., measurement values can include "1," "16," etc., and units of measurement can include "MP," "terabyte," "camera viewfinder type," etc.). The measurement value and the unit of measurement may be associated with an attribute in the plurality of items (e.g., a unit of measurement is one type of attribute and/or helps describe an attribute of a plurality of items).

The item module 238 may also be configured to identify a unit of measurement. For example, the process of identifying a measurement may include receiving a pre-defined unit of measurement, parsing the item information to form portions of item information, comparing one or more portions of item information with the pre-defined unit of measurement from a unit dictionary, and determining at least one unit of measurement in the item information. The unit of measurement may be determined when at least one portion of item information matches the pre-defined unit of measurement from the unit dictionary.

The item module 238 may also be configured to identify the measurement value and/or the unit of measurement in the item information, independent of identification from a second source. For example, the computing device may identify the dimensions of an item (e.g., a plurality of hard drives, etc.) based on the item information and not the manufacturer's specifications or network page identifying the dimensions. In some examples, the computing device may use multiple sources of information without diverting from the scope of the disclosure.

The item module 238 may also be configured to identify one or more items associated with an attribute (e.g., all cameras with 15 MP, all hard drives with 2 TB of internal hard drive capacity, etc.). The items may be associated with one or more item identifiers. In some examples, the item information may be provided (e.g., by the merchants) to offer a plurality of items to users to order. In some examples, the users may order the items through an electronic marketplace.

The memory 218 may also include a clustering module 240. The clustering module 240 may be configured to form a cluster. For example, a cluster of the plurality of items (e.g., item identifiers, links to items, etc.) may be formed based at least in part on the measurement of value and the unit of measurement associated with the attribute in the plurality of items. In some examples, the cluster is determined or formed by grouping, by the computing device, the plurality of items by one or more attributes.

The clustering module 240 may also be configured to filter clusters by distribution kernel distance. For example, the process may compare one or more clusters with a distribution kernel distance and remove the one or more clusters from the user interface in response to the comparison.

The clustering module 240 may also be configured to implement a clustering algorithm on the plurality of items to form the cluster. The clustering algorithm can form the cluster based in part on the importance of the cluster to a user. The importance of the cluster can be identified in a variety of ways, including user behavioral metrics with a network page or user interface (e.g., activating an identification of a cluster, ordering an item associated with a cluster, viewing a network page associated with details of an item, etc.)

The importance can also be measured by a number of textual descriptions provided by merchants that include an attribute (e.g., "16 MP" and "20 MP" occur 67% of the time, so the attribute associated with "MP" is probably important to merchants when they advertise their items). The importance may be identified when the value is compared with a threshold and the value meets or exceeds the threshold.

The memory 218 may also include an exclusion rate module 242. An exclusion rate may be associated with the concept of excluding attribute groups for an item. For example, a radio electronic device may include several attributes, including cable length and signal strength. The cable length attribute can include clusters including 5-feet, 10-feet, 20-feet, and 30-feet, while the signal strength cluster can include 2,000-feet and 3,000-feet. A plurality of radios may be associated with these clusters, but a single radio in the plurality of radios may only be associated with one cluster of each attribute at a time. For example, radio A may be associated with 10-feet of cable length and 2,000-feet of signal strength and radio B may be associated with 20-feet of cable length and 1,000-feet of signal strength. Radio A may not be associated with two clusters for cable length (e.g., 10-feet and 30-feet), but can be associated with two attributes (e.g., cable length and signal strength).

The exclusion rate module 242 may be configured to limit a cluster and/or attribute. For example, the exclusion rate module 242 may be configured to apply an exclusion rate when items are associated with a conflicting attribute or cluster (e.g., the items cannot be associated with both 10-feet and 20-feet in the "cable length" clusters). In some examples, the exclusion rate can be associated with a common attribute in the plurality of items.

The exclusion rate module 242 may also be configured to compare one or more clusters items with an exclusion rate. The exclusion rate can confirm that a limited number of clusters are associated with the one or more items. In response to the comparison, the one or more clusters may be removed from an association with the items.

The memory 218 may also include a threshold module 244. A threshold can include any value compared with a metric to determine the importance of the value. For example, a threshold may be compared with the number of attributes in a cluster to help determine if too many or too few attributes are in the cluster. This may be beneficial to provide a desirable number of identifications of a cluster on a user interface (e.g., 3-5 indications, no more than 10, etc.). In another example, a threshold may be compared with the number of activation requests that a particular indication of the cluster receives. When the number of activation requests exceeds the threshold, the indication of the cluster may be important to users (e.g., 5 MP is activated 20 times per day but 1 MP is activated 1 time per day, which is below a 10 times per day threshold). In other examples, the threshold may be associated with a click rate (e.g., activating a cluster or other indication or link), hit rate (e.g., viewing an item detail network page), order or purchase rate, item availability, or other thresholds (e.g., to help manage a display on a user interface).

The threshold module 244 may be configured to compare the number of items in the cluster with a threshold. The threshold may be associated with a second number of items in the plurality of items. For example, the threshold may be associated with a minimum number of items in order to identify a cluster (e.g., a cluster may include more than 1 item).

The threshold module 244 may also be configured to compare a user's interactions with a cluster to a threshold. For example, the threshold module 244 may be configured to receive a click rate associated with the cluster, compare the click rate with a click rate threshold, and remove the identification of the cluster from the network page when the click rate is below the click rate threshold.

The memory 218 may also include a network page module 246. The network page module 246 may be configured to display one or more identifications of clusters on a network page or user interface. The network page module 246 may also adjust a network page enabled to be displayed by a computing device operated by a user. The adjustment may include an identification of the cluster when the number of items in the cluster at least satisfies the exclusion rate or meets the threshold (e.g., at least 20%, etc.).

In some examples, the user interface can be adjusted to include an identification of the cluster when the cluster at least meets a threshold number of items in the plurality of items. For example, the cluster may correspond with 1,000 items from 1,000 merchants. When the threshold is 500, an identification of the cluster may be provided with the user interface. In another example, a plurality of items may be discontinued (e.g., hard drives with a capacity of 1 MB). The user interface can be adjusted to exclude an identification of the cluster when the cluster fails to meet a threshold number of items (e.g., no merchants are offering the item).

In some examples, adjusting the user interface affects a visual representation of the attribute on a network page. For example, the indication of the cluster and/or attribute may be removed from the network page, which can affect the visual representation of the attribute. In another example, the attribute may be placed higher or lower on the network page (e.g., based in part on the click rate, popularity/importance, order rate, item availability, etc.).

The network page module 246 may also be configured to display one or more items. The plurality of items may be included in a catalog of items offered on an electronic marketplace (e.g., a network page that offers a plurality of merchants and items from a shared network location, a network page with shared shopping cart functionality that allows ordering of items from multiple locations and merchants in one transaction, etc.). In some examples, the adjusted user interface allows a user to order one or more individual item identifiers displayed by the network page.

The network page module 246 may also be configured to change one or more items that are displayed on a network page in response to a search query from a user. For example, the user may provide a search query that includes "hard drives 1 TB." The items provided to the user via the user interface may include hard drives that include a hard drive capacity of 1 TB. The indication of clusters (e.g., on the left-hand side of the network page) may include an activation of the cluster (e.g., a check box, etc.) and/or remove the particular attribute from the network page (e.g., because the user provided importance of the attribute with the original search query).

The network page module 246 may also be configured to interact with the clustering module 240 to generate an identification of a cluster and/or the cluster (e.g., using a learning algorithm). For example, a network page can provide three identifications of clusters, including a 1 TB cluster, a 1.5 TB cluster, and a 2 TB cluster. The behavioral metrics can identify that clusters "1 TB" and "2 TB" are activated 90% of the time, while cluster "1.5 TB" is only activated 10%. The clustering module 240 and/or network page module 246 may identify that 1.5 TB is activated less frequently than the other clusters (e.g., based on a threshold, time frame, audit, etc.). The 1.5 TB cluster can be removed (e.g., from the network page or user interface). In some examples, the remaining indications may be e adjusted as well (e.g., "1 TB to 1.9 TB" as one cluster and "2 TB and up" as another cluster, etc.).

The network page module 246 may also be configured to associate items with at least one cluster by the item's individual item identifiers. When the cluster(s) are activated at the network page, the item identifiers associated with the cluster may be displayed by a network page at a computing device operated by a user.

The network page module 246 may also be configured to associate a second plurality of items with the at least one cluster and enable the second plurality of items to be displayed by a network page at a computing device operated by a user when the at least one cluster is activated. In some examples, the activation of a cluster may be associated with one or more items that include item identifiers. When the cluster is activated, the items associated with the item identifiers may be displayed for the user.

Figure 3:
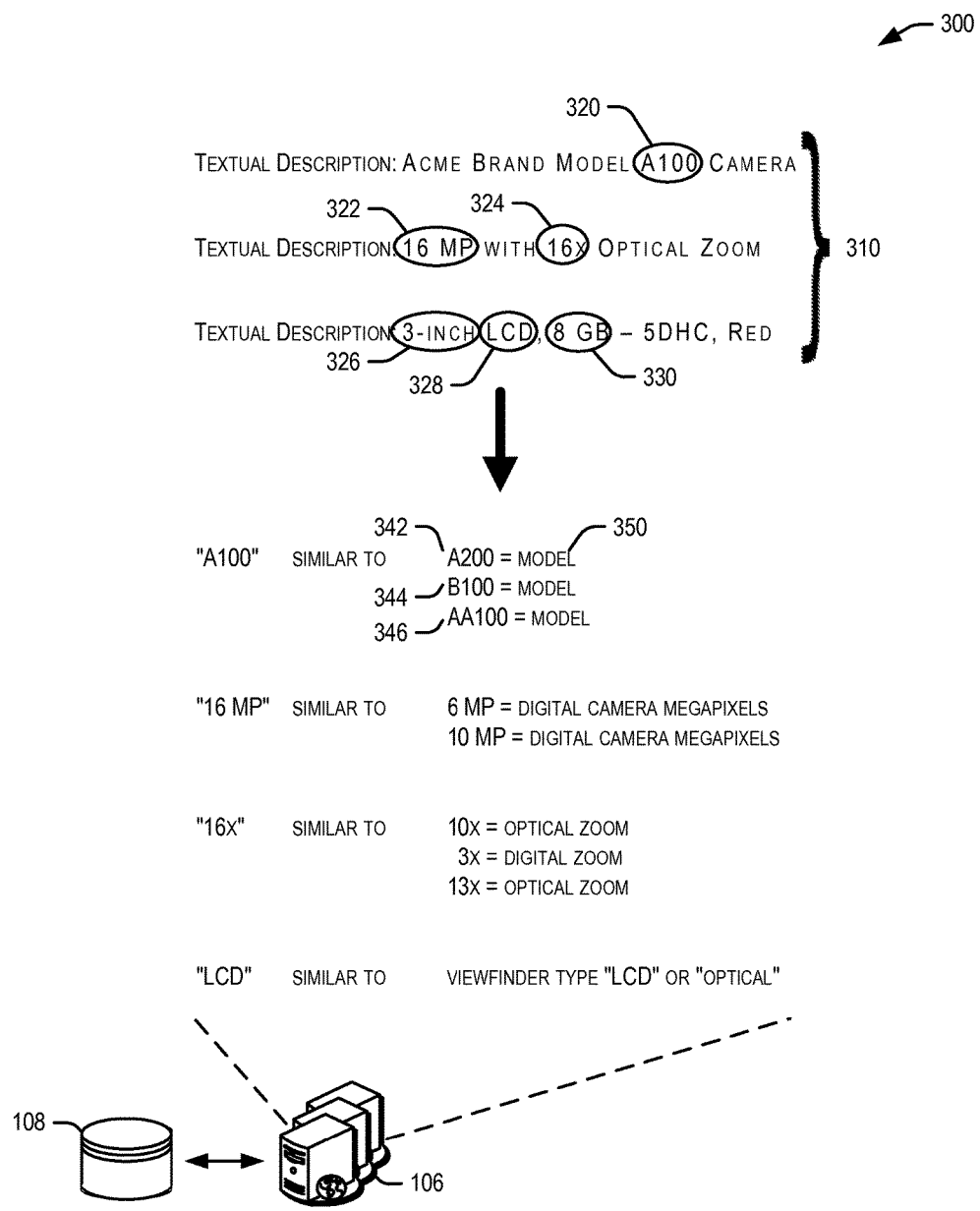
FIG. 3 illustrates some examples of identifying an attribute associated with a cluster and/or group of items described herein, according to at least one example.

FIG. 3 illustrates some examples of identifying an attribute associated with a cluster and/or group of items described herein, according to at least one example. In illustration 300, item information 310 may be received. The item information 310 can include one or more textual descriptions associated with a plurality of items.

One or more attributes, measurement values, and/or units of measurement may be identified in the item information 310. For example, as illustrated in the first textual description, attribute 320 is identified as "A100." The attribute may be identified by comparing one or more portions of the textual description with a unit dictionary, parsing the textual description to identify one or more attributes, identifying a term with a combined letter and number (e.g., letter "A" with number "100," etc.) or other methods described herein. Other attributes may be identified as well. For example, as illustrated in the second textual description, attribute 322 is identified as "16 MP" and attribute 324 is identified as "16×." As illustrated in the third textual description, attribute 326 is identified as "3-inch," attribute 328 is identified as "LCD," and attribute 330 is identified as "8 GB." Other attribute formats or examples may be identified without diverting from the scope of the disclosure.

The identified attributes may be used to form one or more clusters or groups of items. For example, clusters may be associated with one or more attributes, measurement values, and/or units of measurement associated with identified attributes. In some examples, the clusters or groups may be formed when attributes are similar. For example, attribute 320 (e.g., "A100") may be similar to other attributes, including attribute 342 identified as "A200," attribute 344 identified as "B100," and attribute 346 identified as "AA100."

In some examples, the clusters may be identified as a particular feature 350 of a group of items. For example, A100 may refer to a model number for a camera. A process (e.g., clustering algorithm) can determine that A100 is the model number based in part on the association of other similar items (e.g., other cameras include model numbers A200, B 100, etc., so this cluster or group of cameras includes model number A100, etc.). In some examples, the item information (e.g., including the textual description) can include additional data to help determine the type of item. As illustrated, the terms "Acme Brand," "model," and "camera" may be identified as terms and/or attributes relating to a group of items associated with cameras.

Other attributes may be identified as well. For example, attribute "16 MP" may be similar to "6 MP" and "10 MP" in other textual descriptions. When those textual descriptions are identified as relating to cameras, the current textual description with the term "16 MP" also probably refers to a camera. In another example, attribute "16×" may be similar to "10×," "3×," and "13×" in other textual descriptions. When those textual descriptions are identified as relating to cameras, the current textual description with the term "16×" also probably refers to a camera. In another example, attribute "LCD" may be a common way to describe viewfinders for cameras (e.g., based on the thousands of textual descriptions received from merchants, etc.). When those textual descriptions are identified as relating to cameras, the current textual description with the term "LCD" also probably refers to a camera.

Figure 4:
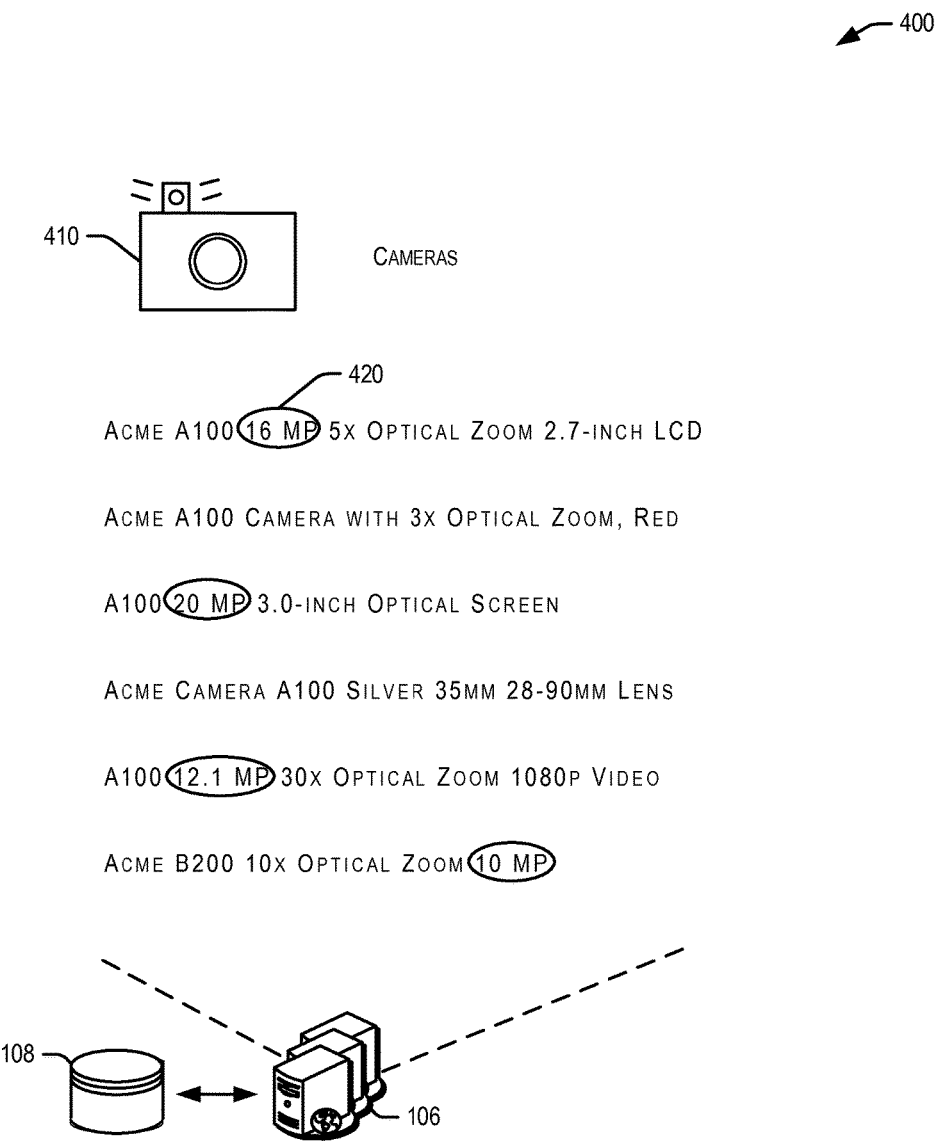
FIG. 4 illustrates some examples of filtering data described herein, according to at least one example.

FIG. 4 illustrates some examples of filtering data described herein, according to at least one example. In illustration 400, a type of item is identified as relating to one or more clusters or groups. The item 410 can be a camera, which is associated with various types of cameras from various brands and models.

Once the groups or clusters are formed, the groups or clusters may be filtered by computing device 106 and/or data store 108. As explained herein, the process may filter the groups in various ways, including through the use of an exclusion rate, comparing the number of items, attributes, etc. to a threshold, and the like. In some examples, the groups or clusters may be filtered by an attribute 420, like digital camera megapixels. The items having a similar attribute or an attribute within a range of attribute values, may be combined into a group or cluster.

For example, six textual descriptions are shown in illustration 400, where four out of the six textual descriptions include the same attribute (e.g., digital camera megapixels). When the threshold is 30% (or some other value), the attribute "digital camera megapixels" may be identified as an attribute and/or cluster that merchants prefer to use to advertise and/or describe cameras (e.g., in the aggregate).

Figure 5:
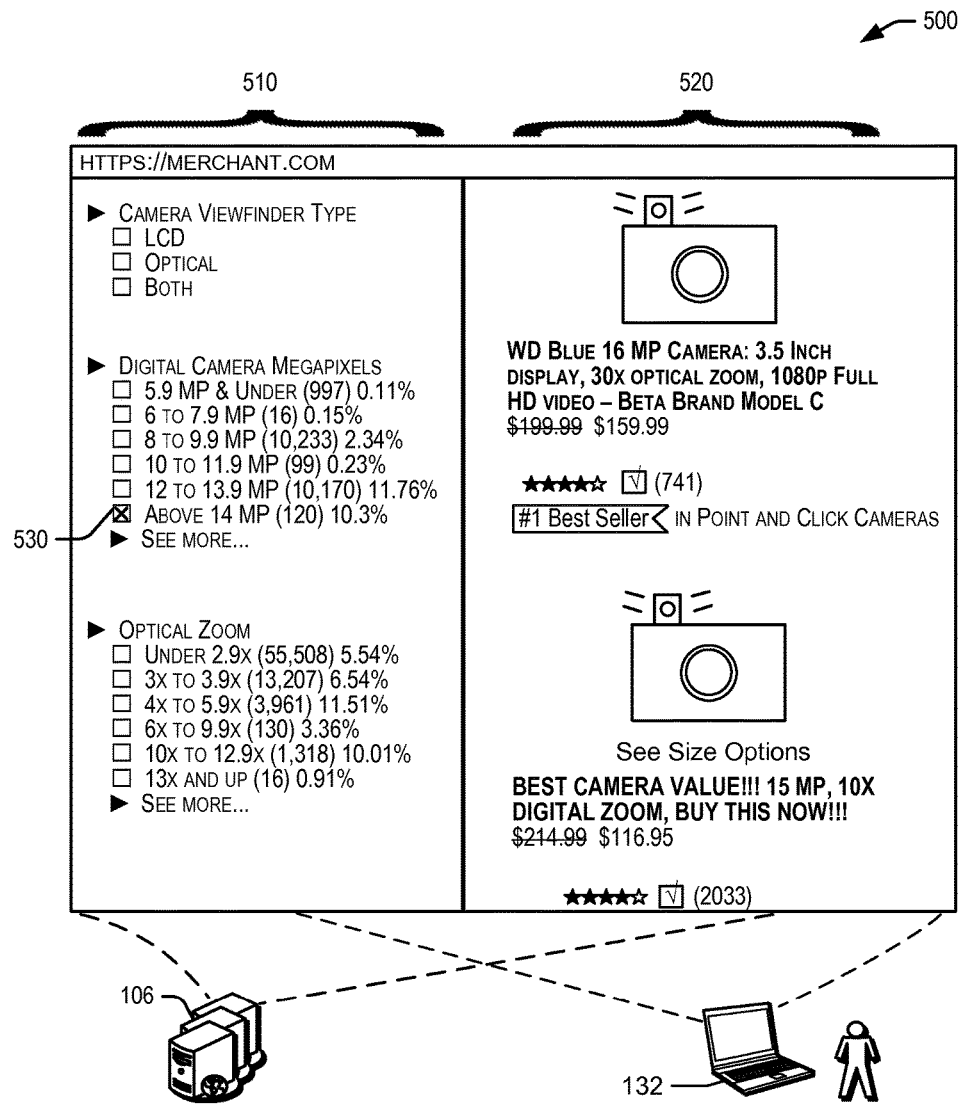
FIG. 5 illustrates some examples of adjusting a user interface and/or network page described herein, according to at least one example.

FIG. 5 illustrates some examples of adjusting a user interface and/or network page described herein, according to at least one example. In illustration 500, the groups or clusters 510 may be displayed on a network page by the computing device 106 (e.g., an electronic marketplace computing device, a merchant computing device, a computing device that hosts network pages, etc.). One or more items 520 corresponding to the groups or clusters 510 may also be displayed by the computing device 106.

The network page can be displayed by the user's computing device 132. In some examples, a group or cluster may be activated by a user, as illustrated with cluster 530. When activated, the selection of one or more items 520 may be updated so that items associated with that cluster may be displayed at the network page.

Figure 6:
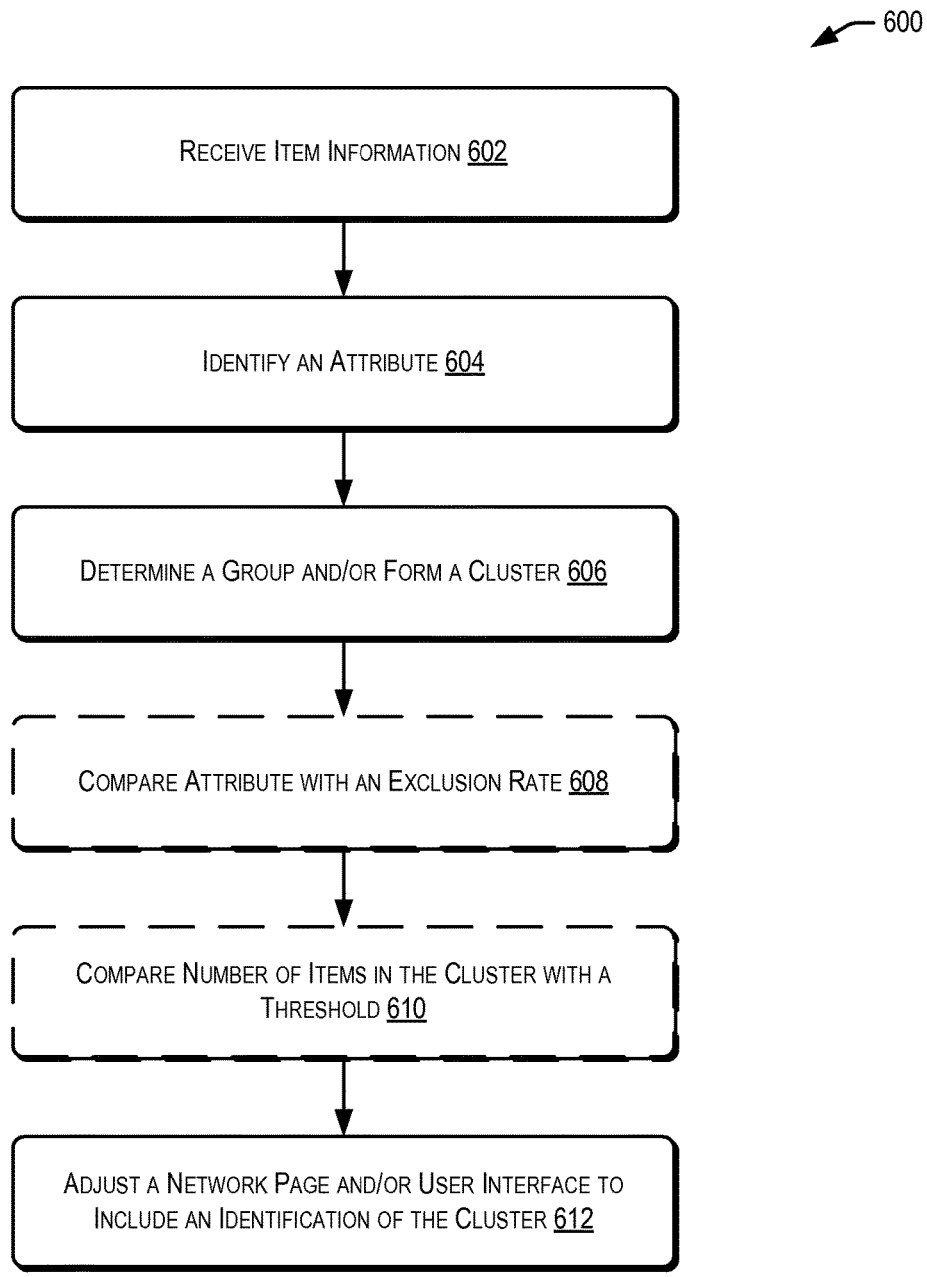
FIG. 6 illustrates an example flow diagram for extracting quantitative data for searchable ordering described herein, according to at least one example.

FIG. 6 illustrates an example flow diagram for extracting quantitative data for searchable ordering described herein, according to at least one example. In some examples, the one or more item management computers 210 (e.g., utilizing at least one of the input module 236, the item module 238, the clustering module 240, the exclusion rate module 242, the threshold module 244, and/or the network page module 246) or one or more user devices 204 shown in FIG. 2 may perform the process 600 of FIG. 6.

The process 600 may begin at 602 by receiving item information. For example, the item information may include one or more textual descriptions or images of the plurality of items. The item information may include unstructured quantitative data (e.g., sentences stored outside of a database, an email or application programming interface (API) that accepts item information outside of a form or template, human language, etc.).

At 604, the process 600 may include identifying an attribute. For example, the attribute may include a measurement value and a unit of measurement in the item information. The measurement value or unit of measurement may be associated with an attribute in the plurality of items, including one or more common attributes amongst several item descriptions (e.g., thousands, millions, etc.). In some examples, the attribute(s) may be identified through a combined analysis of the item information and a unit dictionary.

At 606, the process 600 may include determining a grouping and/or forming a cluster. For example, forming a cluster of the plurality of items can be based at least in part on the attribute, measurement of value, or the unit of measurement. Clustering algorithms, filter(s), and/or computed kernel distances may be implemented to group and/or form the cluster(s) as well.

At 608, the process 600 may optionally include comparing an attribute with an exclusion rate (e.g., phrase group exclusion rate). The exclusion rate can confirm a limited number of common attributes in the plurality of items. For example, a radio electronic device may include several attributes, including cable length and signal strength. The cable length attribute can include clusters including 5-feet, 10-feet, 20-feet, and 30-feet, while the signal strength cluster can include 2,000-feet and 3,000-feet. A plurality of radios may be associated with these clusters, but a single radio in the plurality of radios may only be associated with one cluster of each attribute at a time. For example, radio A may be associated with 10-feet of cable length and 2,000-feet of signal strength and radio B may be associated with 20-feet of cable length and 1,000-feet of signal strength. Radio A may not be associated with two clusters for cable length (e.g., 10-feet and 30-feet), but can be associated with two attributes (e.g., cable length and signal strength).

At 610, the process 600 may optionally include comparing a number of items in the cluster with a threshold (e.g., a cluster may include more than 1 item). For example, the threshold can be associated with a second number of items in the plurality of items. In another example, the threshold may be associated with behavioral metrics, including a minimum number of activation requests are received from users in association with an indication of a cluster, click rate (e.g., activating a cluster or other indication or link), hit rate (e.g., viewing an item detail network page), order or purchase rate, or item availability.

Further in some examples, the process 600 may end at 612, where the process 600 may include adjusting a network page and/or user interface to include an identification of the cluster. For example, the network page and/or user interface may be enabled to be displayed by a computing device operated by a user. The identification of the cluster may be included with the network page and/or user interface when the number of items in the cluster at least satisfies the exclusion rate or meets the threshold.

Illustrative methods and systems for providing image analysis/management are described above. Some or all of these systems and methods may, but need not, be implemented at least partially by architectures such as those shown at least in FIGS. 1-6 above.

Figure 7:
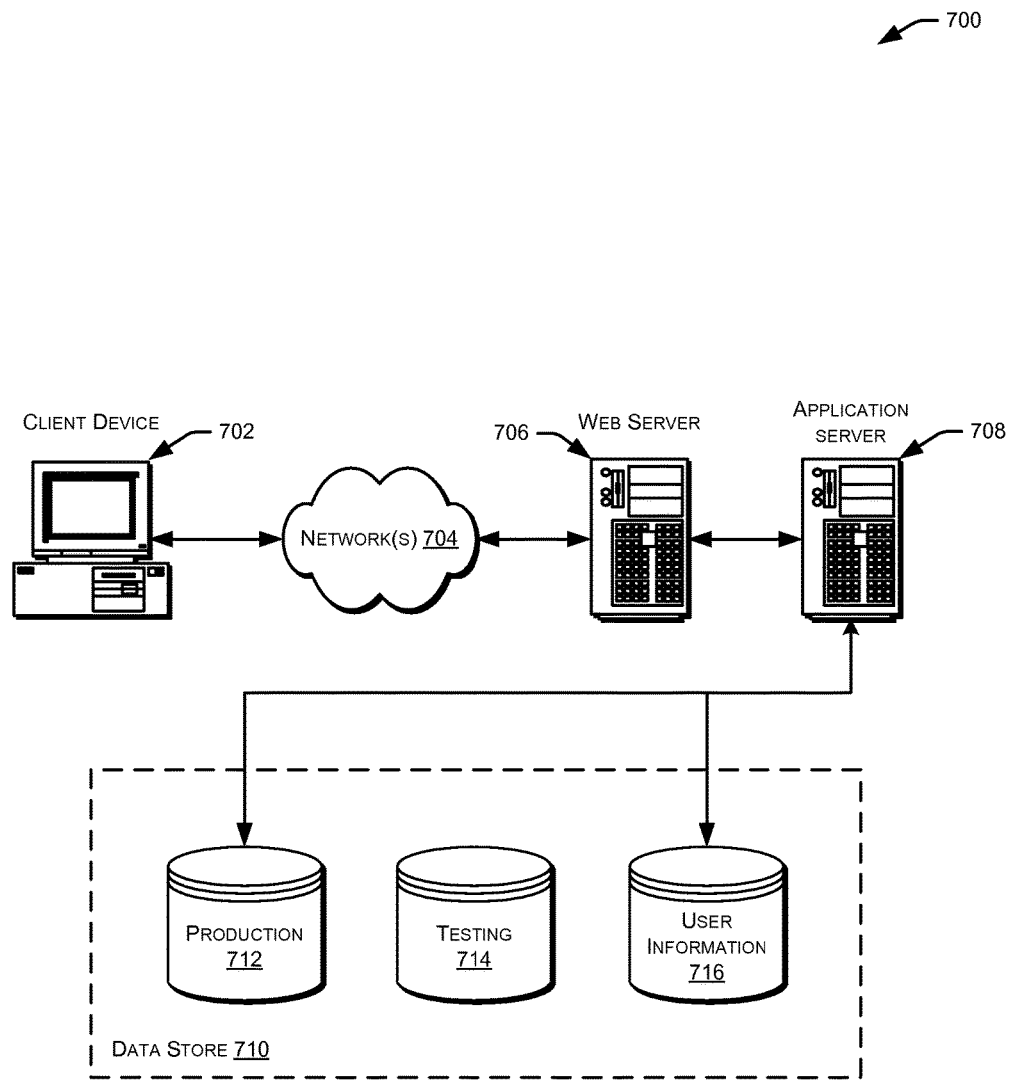
FIG. 7 illustrates an environment in which various embodiments extracting quantitative data for searchable ordering described herein can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl®, Python® or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media collectively storing computer-executable instructions that, when executed by one or more computer systems, configure the one or more computer systems to collectively perform operations comprising:
    receiving unstructured item information associated with a plurality of items, the unstructured item information including one or more textual descriptions of the plurality of items;
    providing a network page for displaying at least some of the unstructured item information associated with the plurality of items, the network page configured to be displayed by a computing device operated by a user;
    converting the unstructured item information to a measurement value and a unit of measurement, comprising:
        parsing the unstructured item information to determine a textual description,
        comparing the textual description with a dictionary of values and units of measurements, and
        determining the measurement value and the unit of measurement based at least in part on matching the textual description with at least one entry of the dictionary, the measurement value and the unit of measurement associated with an attribute in the plurality of items;
    determining a first cluster of the plurality of items and a second cluster of the plurality of items based at least in part on the measurement value and the unit of measurement associated with the attribute in the plurality of items;
    storing the measurement value and the unit of measurement as structured data in a data store;
    determining a number of clusters that correspond with different measurement values of the unit of measurement, the clusters for an item including at least the first cluster and the second cluster;
    comparing the number of clusters for the item with an exclusion rate, the exclusion rate enabling confirmation of a limited number of common units of measurement in the plurality of items;
    merging the first cluster and the second cluster that correspond with the unit of measurement into a merged cluster;
    and
    providing, on the network page enabled to be displayed by the computing device, an identifying user interface element of the merged cluster that includes at least the unit of measurement of the merged cluster, wherein the merged cluster includes at least one item associated with the first cluster and the second cluster.

2. The one or more non-transitory computer-readable storage media of claim 1, wherein identifying the unit of measurement in the unstructured item information includes:
    receiving a pre-defined unit of measurement;
    parsing the unstructured item information to form portions of item information;
    comparing one or more portions of item information with the pre-defined unit of measurement from a unit dictionary; and
    determining at least one unit of measurement in the unstructured item information when at least one portion of item information matches the pre-defined unit of measurement from the unit dictionary.

3. The one or more non-transitory computer-readable storage media of claim 1, wherein the plurality of items is included in a catalog of items offered on an electronic marketplace.

4. The one or more non-transitory computer-readable storage media of claim 1, wherein the measurement value and the unit of measurement are identified in the unstructured item information, independent of identification from a second source.

5. The one or more non-transitory computer-readable storage media of claim 1, wherein the operations further comprise:
    receiving a second measurement value and a second unit of measurement from the dictionary of values;
    comparing a second textual description with the second measurement value or the second unit of measurement; and
    determining an item from the plurality of items based at least in part on the comparison of the second textual description with the second measurement value or the second unit of measurement.

6. A computer-implemented method, comprising:
    receiving, by a computing device, unstructured item information associated with a plurality of items;
    providing a network page for displaying at least some of the unstructured item information associated with the plurality of items, the network page configured to be displayed by the computing device;
    converting the unstructured item information to an attribute, comprising:
        parsing the unstructured item information to determine a textual description,
        comparing the textual description with a dictionary of values and units of measurements, and
        determining the attribute based at least in part on matching the textual description with at least one entry of the dictionary, the attribute identified based at least in part on unit information included in the dictionary;
    determining a grouping, by the computing device, of the plurality of items by the attribute to form a first cluster and a second cluster;
    storing the attribute as structured data in a data store;
    determining a number of clusters that correspond with different measurement values of the unit of measurement, the clusters for an item including at least the first cluster and the second cluster;

comparing the number of clusters for the item with an exclusion rate, the exclusion rate configured to enable confirmation of a second number of common attributes in the plurality of items;

merging the first cluster and the second cluster that correspond with the unit of measurement into a merged cluster; and providing, on the network page enabled to be displayed by the computing device, an identifying user interface element of the merged cluster that includes at least the unit of measurement of the merged cluster, wherein the merged cluster includes at least one item associated with the first cluster and the second cluster.

7. The computer-implemented method of claim 6, wherein the attribute is a quantitative attribute that describes a portion of the plurality of items.

8. The computer-implemented method of claim 6, wherein the unstructured item information associated with the plurality of items is unstructured data.

9. The computer-implemented method of claim 8, wherein the unstructured data is a textual description or image.

10. The computer-implemented method of claim 6, further comprising:
determining a second grouping of the plurality of items to form a second cluster; and
merging the first cluster and the second cluster when the first cluster and the second cluster correspond to a same type of the plurality of items.

11. The computer-implemented method of claim 6, further comprising:
comparing one or more clusters with a distribution kernel distance; and
removing the one or more clusters from the network page in response to the comparison.

12. The computer-implemented method of claim 6, wherein adjusting the network page affects a visual representation of the attribute on the network page.

13. The computer-implemented method of claim 6, wherein adjusting the network page changes one or more items that are displayed on the network page in response to a search query from a user.

14. The computer-implemented method of claim 6, wherein the dictionary defines a translation between an abbreviated attribute in the plurality of items and a predefined attribute in the plurality of items.

15. A computing device comprising:
a memory configured to store computer-executable instructions; and
a processor in communication with the memory configured to execute the computer-executable instructions to at least:
receive unstructured item information associated with a plurality of items;
provide a network page for displaying at least some of the unstructured item information associated with the plurality of items, the network page configured to be displayed by the computing device;
convert the unstructured item information to a measurement value and a unit of measurement, comprising:
parsing the unstructured item information to determine a textual description,
comparing the textual description with a dictionary of values and units of measurements, and
determining the measurement value and the unit of measurement based at least in part on matching the textual description with at least one entry of the dictionary, the measurement value and unit of measurement associated with an attribute in the plurality of items;
form a first cluster of the plurality of items and a second cluster of the plurality of items based at least in part on the measurement value and the unit of measurement associated with the attribute in the plurality of items;
store the measurement value and the unit of measurement as structured data in a data store;
determine a number of clusters that correspond with different measurement values of the unit of measurement, the clusters for an item including at least the first cluster and the second cluster;
compare the number of clusters for the item with an exclusion rate, the exclusion rate enabling confirmation of a limited number of common units of measurement in the plurality of items;
merge the first cluster and the second cluster that correspond with the unit of measurement into a merged cluster; and
provide, on the network page enabled to be displayed by the computing device, an identifying user interface element of the merged cluster that includes at least the unit of measurement of the merged cluster, wherein the merged cluster includes at least one item associated with the first cluster and the second cluster.

16. The computing device of claim 15, wherein the processor is further configured to execute the computer-executable instructions to at least:
implement a clustering algorithm on the plurality of items to form the first cluster and the second cluster, wherein the clustering algorithm forms the first cluster and the second cluster based in part on an importance of the first cluster and the second cluster to a user.

17. The computing device of claim 15, wherein the processor is further configured to execute the computer-executable instructions to at least:
associate a second plurality of items with the first or the second cluster, wherein the second plurality of items includes individual item identifiers; and
enable the second plurality of items to be displayed by the network page at the computing device when the first or the second cluster is activated.

18. The computing device of claim 17, wherein the network page allows a user to identify a sequential order of one or more individual item identifiers displayed by the network page.

19. The computing device of claim 15, wherein the attribute is a quantitative attribute that describes a portion of the plurality of items.

20. The computing device of claim 15, wherein the unstructured item information associated with the plurality of items is unstructured data.

* * * * *